A. MURPHY.
APPARATUS FOR ELECTROPLATING AND THE LIKE.
APPLICATION FILED OCT. 22, 1913.
1,105,292.
Patented July 28, 1914.
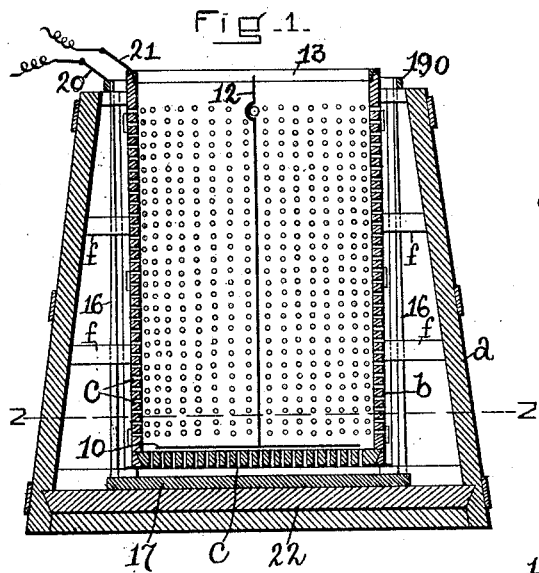
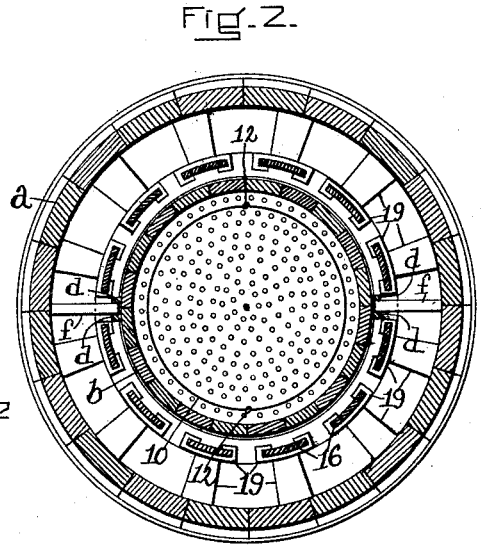
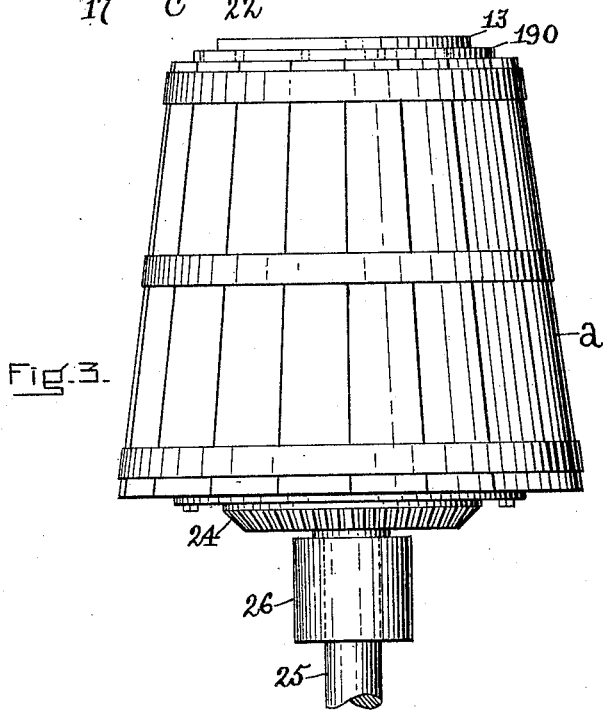
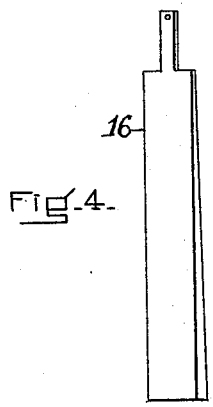
WITNESSES:
John Buckler.
J. Murphy
INVENTOR:
Arthur Murphy
by Jav. H. Churchill
Atty.

UNITED STATES PATENT OFFICE.

ARTHUR MURPHY, OF QUINCY, MASSACHUSETTS.

APPARATUS FOR ELECTROPLATING AND THE LIKE.

1,105,292.

Specification of Letters Patent. Patented July 28, 1914.

Application filed October 22, 1913. Serial No. 796,713.

*To all whom it may concern:*

Be it known that I, ARTHUR MURPHY, a citizen of the United States, residing in Quincy, county of Norfolk, and State of Massachusetts, have invented an Improvement in Apparatus for Electroplating and the like, of which the following description, in connection with the accompanying drawings, is a specification, like characters on the drawings representing like parts.

This invention relates to an apparatus especially applicable among other uses, to be employed for electroplating purposes, and especially for plating all small articles, such as rivets, lacing hooks, eyes, and the like.

The present invention has for its object to provide an apparatus of the character described, with which a more uniform plating at a minimum cost may be effected. To this end, the apparatus is provided with a rotatable outer receptacle or vessel, preferably in the form of a conical barrel, which is open at its upper end, and within which is located a perforated inner vessel or receptacle, which is preferably cylindrical in shape and is designed to hold the work to be treated. The inner vessel is preferably connected with the outer vessel to rotate therewith, and contains a cathode element, which is fixed thereto to revolve therewith, and the outer vessel contains within it, an anode element, which is secured in fixed relation to the outer vessel and is located in close proximity to the inner vessel and to the cathode element therein, so that said cathode and anode elements are in close proximity to each other, whereby the resistance offered to the passage of the current through the electrolyte which is contained in both vessels may be reduced to a minimum. The perforations in the inner vessel permit the electrolyte to circulate through the inner vessel as the outer and inner vessels are revolved, which enables the solution or electrolyte in contact with the work to be maintained at a substantially uniform strength, whereby uniformity in the work is assured. These and other features of this invention will be pointed out in the claims at the end of this specification.

Figure 1 is a vertical section of one form of apparatus embodying this invention. Fig. 2, a horizontal section of the apparatus shown in Fig. 1, on the line 2—2. Fig. 3, an elevation of the apparatus shown in Fig. 1 with the gearing for rotating the same attached thereto, and Fig. 4, a detail of one of the anodes to be referred to.

Referring to the drawing, $a$ represents the outer vessel or receptacle, which is preferably made of wood or other non-metallic material, and in the form of a conical or tapering barrel, which is open at its top and is made liquid-tight. The vessel $a$ contains within it a vessel $b$, preferably a cylindrical barrel, which is open at its top and is provided in its bottom and body portions with openings or perforations $c$ for the passage of the electrolyte, which is contained in the outer vessel and may be of any well-known or desired solution, such as now commonly used in electroplating. The inner vessel $b$ is preferably secured within the outer vessel so as to rotate with the latter yet be capable of being readily removed therefrom. This may be accomplished, as herein shown, by providing the inner vessel on its outer surface with substantially diametrically opposite strips $d$ (see Fig. 2), which form grooves for the reception of guiding pieces $f$ attached to the inner surface of the outer vessel $a$.

The inner vessel contains a cathode element, which may be made as herein shown and consists of a conducting plate 10, which is located near the bottom and sides of the inner vessel and is suspended by vertical arms or conducting rods 12, both of metal, and said rods are secured to a conducting ring 13, which is supported upon and secured to the upper edge of the inner barrel or vessel. The cathode element is thus affixed to the inner vessel and rotates therewith.

The outer vessel contains the anode element, which may and preferably will be made as herein shown, and consists of a series of conducting bars 16, one of which is shown in Fig. 4 which are arranged in a circle within the outer vessel and around the inner vessel and may rest upon a conducting plate or disk 17, which forms part of the anode. The upper end of each bar 16 is preferably extended above the outer vessel and is secured to a metal ring 190, on which bears the positive brush 20 from a generator, not shown, the negative brush 21 bearing on the ring 13 of the inner barrel or vessel.

The anode bars 16 may be made heavy enough to maintain them in fixed position with relation to the inner and outer vessels, or, if desired, they may be otherwise positioned with relation to said vessels, as, for instance, by means of spacing or guiding pieces 19 of wood secured to the outer vessel and which guide the individual bars 16 as they are inserted into or removed from the outer vessel.

By reference to Fig. 1, it will be observed that the anode bars 16 are in close proximity to the circumference or edge of the cathode plate 10, and the anode plate 17 is also in close proximity to the cathode plate, and, as a result, the current is required to traverse but a small space while passing from one to the other, and the resistance of the electroplating apparatus is reduced to a minimum, consequently economizing in the cost of current.

It will also be observed, that the vessels are connected so as to revolve together, which revolution may be effected in any suitable manner, and in the present instance, the outer vessel has secured to it a bevel gear 24 on a shaft 25, which revolves in a bearing 26, and said gear may be rotated by a bevel pinion (not shown) in a manner well understood.

In operation, the electrolyte is placed in the outer vessel in sufficient quantity to cover the work, which is placed in the inner vessel. The vessels are then set in motion and the current is turned on, and, as the vessels revolve, the electrolyte is caused to circulate through the inner vessel through the perforations thereof and is thereby equalized in strength, that is, the electrolyte is maintained substantially uniform in strength by the circulation as the plating progresses and a superior product results. The conical form of the outer vessel provides for a greater quantity of the electrolyte at the bottom of the outer vessel where most of the work or articles to be coated are located. The apparatus may be inclined more or less to tumble the work. When the electroplating has been completed, the inner vessel with the work contained in it may be readily removed from the outer vessel, which contains the solution.

The invention is herein shown as embodied in an apparatus, which is especially adapted for electroplating purposes, but it is not desired to limit the invention in this respect, as the outer and inner vessels may be used for cleaning purposes.

Furthermore, if desired, an anode may be hung within the inner vessel out of contact with the work.

Claims—

1. In an apparatus of the character described, in combination, a revoluble conical outer vessel, a cylindrical inner perforated vessel, and means interposed between said vessels for connecting them together to permit them to be revolved as one and to permit the inner vessel to be withdrawn from the outer vessel, said means constituting a guide for the inner vessel as it is inserted into and withdrawn from the outer vessel, substantially as described.

2. In an apparatus of the character described, in combination, a revoluble conical outer vessel, a cylindrical inner perforated vessel, means for connecting the said vessels together to permit them to be revolved as one and to permit the inner vessel to be withdrawn from the outer vessel, a cathode within the perforated inner vessel, and an anode within the outer vessel between it and the perforated inner vessel and removable from the outer vessel without disturbing the inner vessel, substantially as described.

3. In an apparatus of the character described, in combination, a revoluble outer vessel, a perforated vessel located within said outer vessel, and guiding pieces attached to one of said vessels, and grooved strips attached to the other of said vessels for connecting said vessels together to permit them to be revolved as one and to permit the inner vessel to be withdrawn from the outer vessel, substantially as described.

4. In an apparatus of the character described, in combination, a revoluble outer vessel, a perforated vessel located within said outer vessel, means for connecting said vessels together to permit them to be revolved as one and to permit the inner vessel to be withdrawn from the outer vessel, and to guide the inner vessel in its movement into and out of said outer vessel and cathode and anode elements in said vessels and separated from each other, substantially as described.

5. In an apparatus of the character described, in combination, a conical outer vessel open at its top, a cylindrical inner vessel located within the outer vessel and removable therefrom through the open top of the outer vessel, means for revolving the outer vessel, a cathode within the inner vessel, a conducting ring carried by said inner vessel and to which the cathode is connected, and an anode within the outer vessel between it and the inner vessel and removable therefrom without disturbing the inner vessel, and a conducting ring secured to said anode, substantially as described.

In testimony whereof, I have signed my name to this specification in the presence of two subscribing witnesses.

ARTHUR MURPHY.

Witnesses:
Jas. H. Churchill,
J. Murphy.